United States Patent [19]
Simmons et al.

[11] Patent Number: 6,079,777
[45] Date of Patent: Jun. 27, 2000

[54] COMBINATION CHAISE LOUNGE AND TOTE CART

[76] Inventors: Stanley R. Simmons; Samantha Simmons, both of 2030 Ipsden Dr., Orlando, Fla. 32837

[21] Appl. No.: 09/339,657

[22] Filed: Jun. 24, 1999

[51] Int. Cl.⁷ .............................. A47C 4/30; A47C 13/00
[52] U.S. Cl. .................... 297/217.1; 297/30; 297/31; 297/129; 297/188.01; 297/188.04; 297/188.2; 280/230; 280/651; 108/157.17
[58] Field of Search ................ 297/217.1, 129, 297/188.01, 188.2, 31; 280/30, 47.18, 648, 650, 651, 655; 108/157.17

[56] References Cited

U.S. PATENT DOCUMENTS

| | | | |
|---|---|---|---|
| D. 367,347 | 2/1996 | Moudrianakis | D34/17 |
| 751,448 | 2/1904 | Barschow | 297/31 X |
| 3,376,547 | 4/1968 | Dominko | 280/452 |
| 3,693,993 | 9/1972 | Mazzarelli et al. | 280/30 |
| 3,947,903 | 4/1976 | Menke | 297/188.01 X |
| 4,114,914 | 9/1978 | Cohen | 280/230 |
| 4,316,615 | 2/1982 | Willette | 280/47.18 X |
| 4,362,308 | 12/1982 | Hicks et al. | 280/30 |
| 4,521,054 | 6/1985 | Deconinck . | |
| 4,645,262 | 2/1987 | Furubotten | 297/129 |
| 4,659,142 | 4/1987 | Kuchinksy, Jr. | 297/129 |
| 4,733,905 | 3/1988 | Buickerood et al. | 297/129 |
| 4,835,896 | 6/1989 | Bowen | 297/188.2 X |
| 4,974,525 | 12/1990 | Sheffield | 108/157.17 X |
| 5,016,792 | 5/1991 | Jay | 297/129 X |
| 5,040,807 | 8/1991 | Snover | 297/217.1 X |
| 5,056,804 | 10/1991 | Wilson | 280/30 |
| 5,265,892 | 11/1993 | Said | 297/129 X |
| 5,289,958 | 3/1994 | Jay | 297/129 X |
| 5,294,158 | 3/1994 | Cheng | 280/651 X |
| 5,356,197 | 10/1994 | Simic | 297/129 |
| 5,362,079 | 11/1994 | Graham | 297/217.1 X |
| 5,364,112 | 11/1994 | Jackson | 280/130 |
| 5,423,592 | 6/1995 | Spurrier et al. | 297/129 |
| 5,460,307 | 10/1995 | Stevenson | 297/30 X |
| 5,492,347 | 2/1996 | Palmeri et al. | 280/30 X |
| 5,547,246 | 8/1996 | Lambert | 297/129 |
| 5,582,458 | 12/1996 | Wildt | 297/188.01 X |
| 5,588,696 | 12/1996 | Jay et al. | 297/129 |
| 5,913,572 | 6/1999 | Grimaldi et al. | 297/188.04 X |
| 5,988,737 | 11/1999 | Tomaiuolo | 297/129 |

*Primary Examiner*—Peter M. Cuomo
*Assistant Examiner*—Rodney B. White
*Attorney, Agent, or Firm*—William M. Hobby, III

[57] ABSTRACT

A combination chaise lounge and tote cart apparatus is formed of a fabric covered base frame having first and second fabric covered extension frames hinged to each end of the base frame. Four foldable wheel assemblies are attached to the base frame so that the wheel assemblies can be moved from an extended position to a forward position and each of the extension frames can be folded over onto the base frame to make a compact chaise lounge and tote cart combination. The wheel assembly can be unfolded to extend the wheels and the first and second extension frames can be opened up to a generally parallel vertical position. A locking bar can be removably connected therebetween to hold the first and second extension frames upright and parallel so that items can be carried on the wheel base and can be laid across the tops of the upright first and second extension frames. A hinged handle is also provided for pulling the cart and one or two fabric sides can be connected between first and second extension frames. A fishing rod holder is connected to the base for holding fishing rods in an upright position. The combination easily converts between a chaise lounge and a tote cart and to a folded position for storage or transportation.

15 Claims, 4 Drawing Sheets

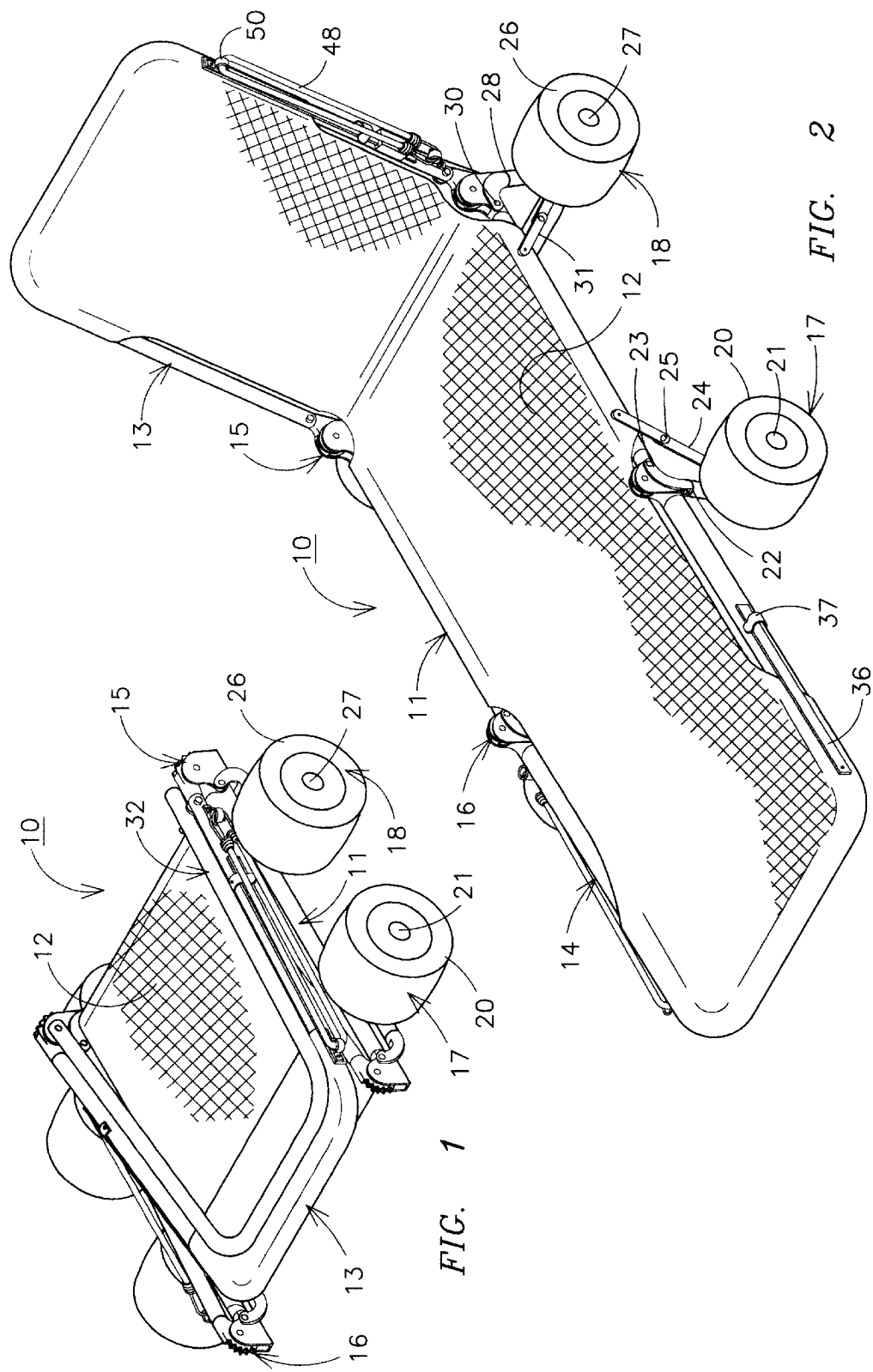

COMBINATION CHAISE LOUNGE AND TOTE CART

BACKGROUND OF THE INVENTION

The present invention relates to a combination chaise lounge and tote cart and especially to a chaise lounge and tote cart which can be set up as a chaise lounge or as a tote cart and can be folded to a storage position.

Outdoor activities have become increasingly popular and many of these activities take the form of picnics or days at the beach. On these type outings, there is frequently no provision for chairs or lounges so that portable foldable chairs and lounges are brought to the location of the outing. In addition, it is frequently necessary to transport various items, such as coolers, blankets, surfboards, and the like, from an automobile to a desired beach or picnic area. The carrying of the various items including the portable seating and lounge devices may require several people or several trips between the car and the beach. Some of the items, such as a cooler full of beverages and ice, can be of considerable weight and can be hazardous for an individual to tote for a long distance. Foldable chairs and beach lounges are commonly available made out of lightweight aluminum tubular frames having a fabric covering which can be folded for storage or for transportation to an outing location. It has also been suggested to provide foldable chairs and lounges with wheels so that they can be rolled to different locations. These wheeled chairs or lounges can be used for carrying a cooler or other items thereon. However, such wheeled chairs and lounges typically have not provided for toting of large items or a large number of items held in a manner that can be easily reloaded and removed after an outing.

Typical prior art wheeled foldable chairs can be seen in the Buickerood et al. U.S. Pat. No. 4,733,905, for a combination chair and cart. A two wheeled vehicle is made to collapse into a retracted position and converts between a two wheeled cart and a chair. It allows one portion of the frame to be used for a handle when used as a cart. Another wheeled chair can be seen in the Palmeri et al., U.S. Pat. No. 5,492,347, in which a chair can be mobilized by attaching a pair of wheels mounted to an axle to the legs of the chair and then using the chair back for a handle. The Hicks et al. U.S. Pat. No. 4,362,308, is for a combination portable chair and container which has a single roller assembly for rolling the chair and container thereon. The chair converts to a rolling container with sides that can be folded into a compact position for storage.

Wheeled chaise lounges can be seen the Dominko U.S. Pat. No. 4,376,547, which is a lounge chair assembly made convertible by a wheel assembly which clamps onto the lounge chair frame. The Kuchinsky, Jr. U.S. Pat. No. 4,659,142, is for a combination beach caddie and beach chair which has a single roller assembly attached to the frame of a chair in such a manner that a portion of the frame can be used for a handle for pushing the beach chair on the roller. The Snover U.S. Pat. No. 5,040,807, is a combination beach chair and wheelbarrow apparatus which has a single wheel connected to the frame of a beach chair and also allows the frame of the beach chair to act as a handle for pushing the beach chair on the wheel when used as a wheelbarrow. The Wilson et al. U.S. Pat. No. 5,056,804, is a folding lounge chair and cart which has a pair of wheels attached to the frame of a folding lounge chair and allows the lounge chair to be extended in a straight position and, when turned over to act as a hand truck. The Mazzarelli et al. U.S. Pat. No. 3,693,993, is for a convertible beach tote cart which uses a single roller on one end of the framework while the other end of the framework of the lounge chair can be used as a handle to push the tote cart.

Other folding chairs or folding lounges which have been wheeled for a combination of uses can be seen in the Jackson U.S. Pat. No. 5,364,112, for a wheel assembly for a combination folding chair and cart and in the Deconinck U.S. Pat. No. 4,521,054, for a chaise lounge and in the Wilson et al. U.S. Pat. No. 5,056,804, for a folding lounge chair and cart and in the Spurrier et al. U.S. Pat. No. 5,423,592, for a combination folding lounge chair and wagon. In the Furubotten U.S. Pat. No. 4,645,262, a camp chair converts to a hand truck. Beach cart patents can be seen in the Willette U.S. Pat. No. 4,316,615, and in the Moudrianakis design U.S. Pat. No. 367,347.

The present invention provides a standard folding chaise lounge with a four wheel base which folds up for storage and rapidly converts to a tote cart which is pulled with a handle and which can carry a cooler, a surfboard, towels, and other beach paraphernalia as well as fishing rods, suntan lotion, and the like. The combination chaise lounge and tote cart rapidly converts between a stored position, a pull-type beach cart, and a chaise lounge in which the folding wheels act as a base for the chaise lounge as well as for the wheels for rolling the cart.

SUMMARY OF THE INVENTION

A combination chaise lounge and tote cart apparatus is formed of a fabric covered base frame having first and second fabric covered extension frames hinged to each end of the base frame. Four foldable wheel assemblies are attached to the base frame so that the wheel assemblies can be moved from an extended position to a forward position and each of the extension frames can be folded over onto the base frame to make a compact chaise lounge and tote cart combination. The wheel assembly can be unfolded to extend the wheels and the first and second extension frames can be opened up to a generally parallel vertical position. A locking bar can be removably connected therebetween to hold the first and second extension frames upright and parallel so that items can be carried on the wheel base and can be laid across the tops of the upright first and second extension frames. A hinged handle is also provided for pulling the cart and one or two fabric sides can be connected between first and second extension frames. A fishing rod holder is connected to the base for holding fishing rods in an upright position. The combination easily converts between a chaise lounge and a tote cart and to a folded position for storage or transportation.

BRIEF DESCRIPTION OF THE DRAWINGS

Other objects, features, and advantages of the present invention will be apparent from the written description and the drawings in which:

FIG. 1 is a perspective view of a combination chaise lounge and wheeled cart in accordance with the present invention in a folded position for storage;

FIG. 2 is the chaise lounge and cart of FIG. 1 opened into a chaise lounge;

DESCRIPTION OF THE PREFERRED EMBODIMENT

Figure 3:
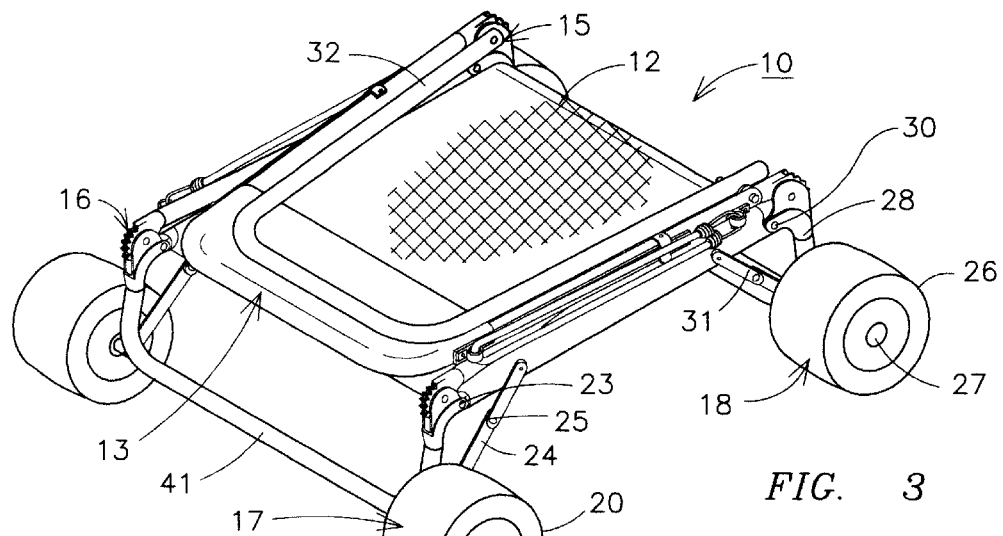
FIG. 3 is a perspective view of the chaise lounge cart of FIGS. 1 and 2 in a folded position with the wheels extended.
Figure 4:
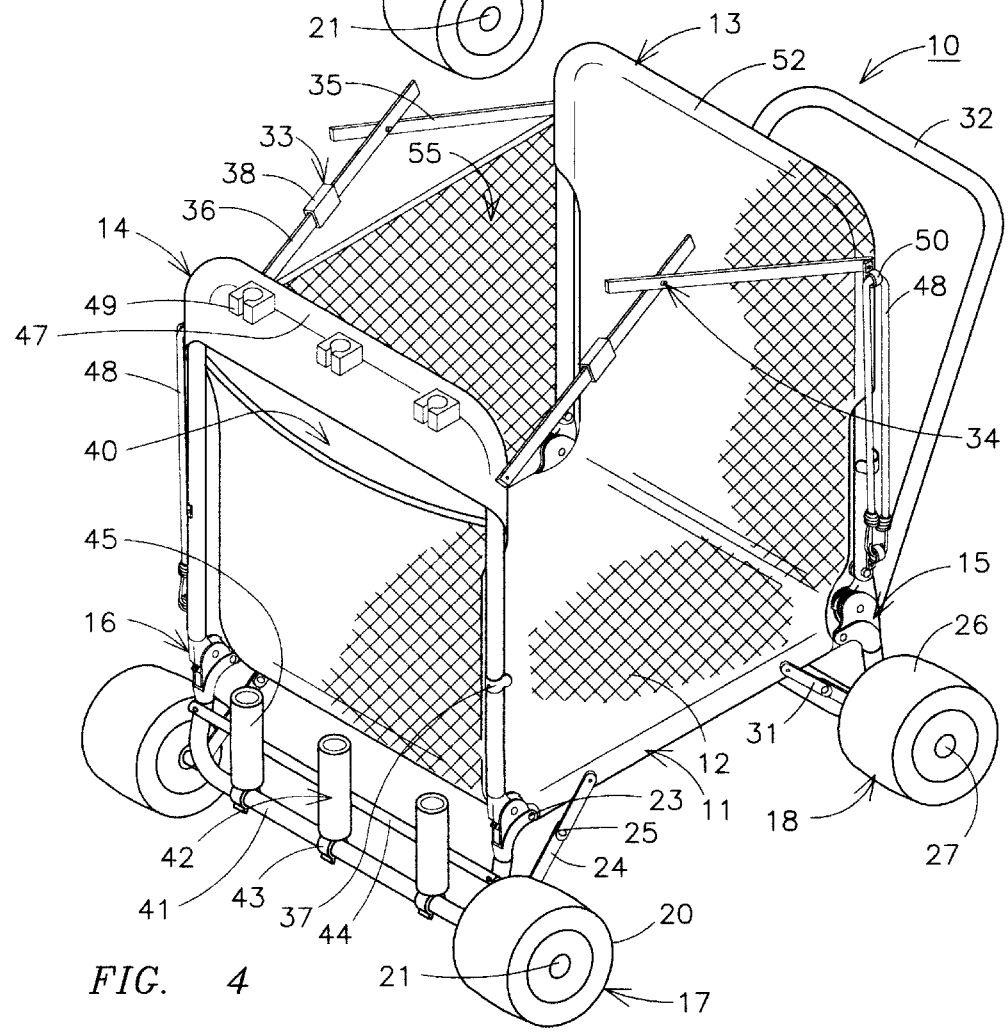
FIG. 4 is a perspective view of the chaise lounge cart FIGS. 1 through 3 in a cart position.
Figure 5:
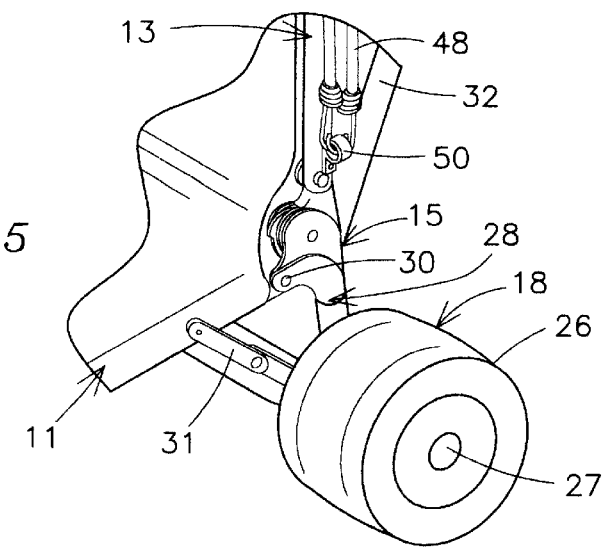
FIG. 5 is a partial perspective view of one wheel assembly of the chaise lounge cart of FIGS. 1 through 4.
Figure 6:
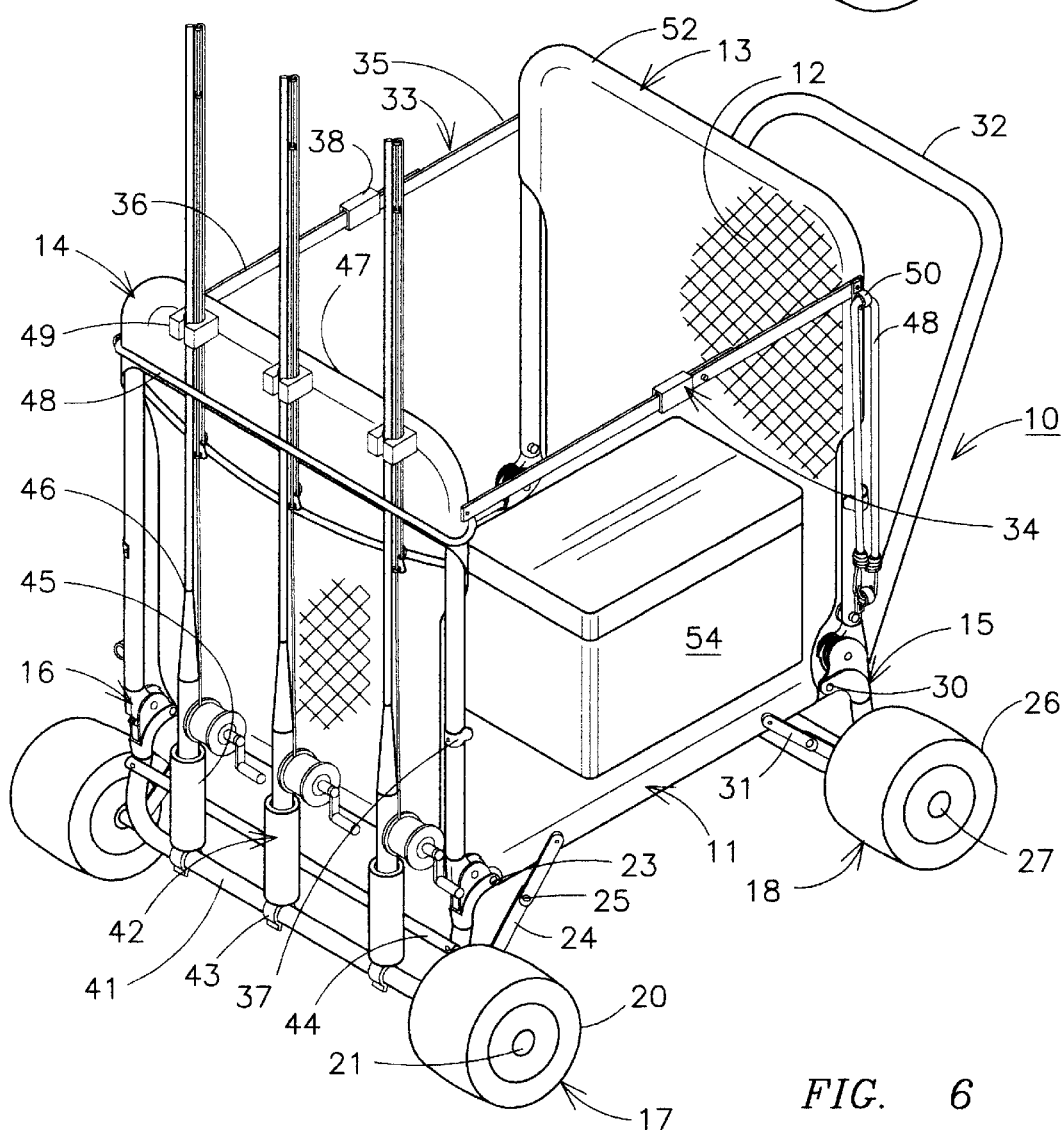
FIG. 6 is a perspective view of the chaise lounge cart loaded with a cooler and fishing rods.
Figure 7:
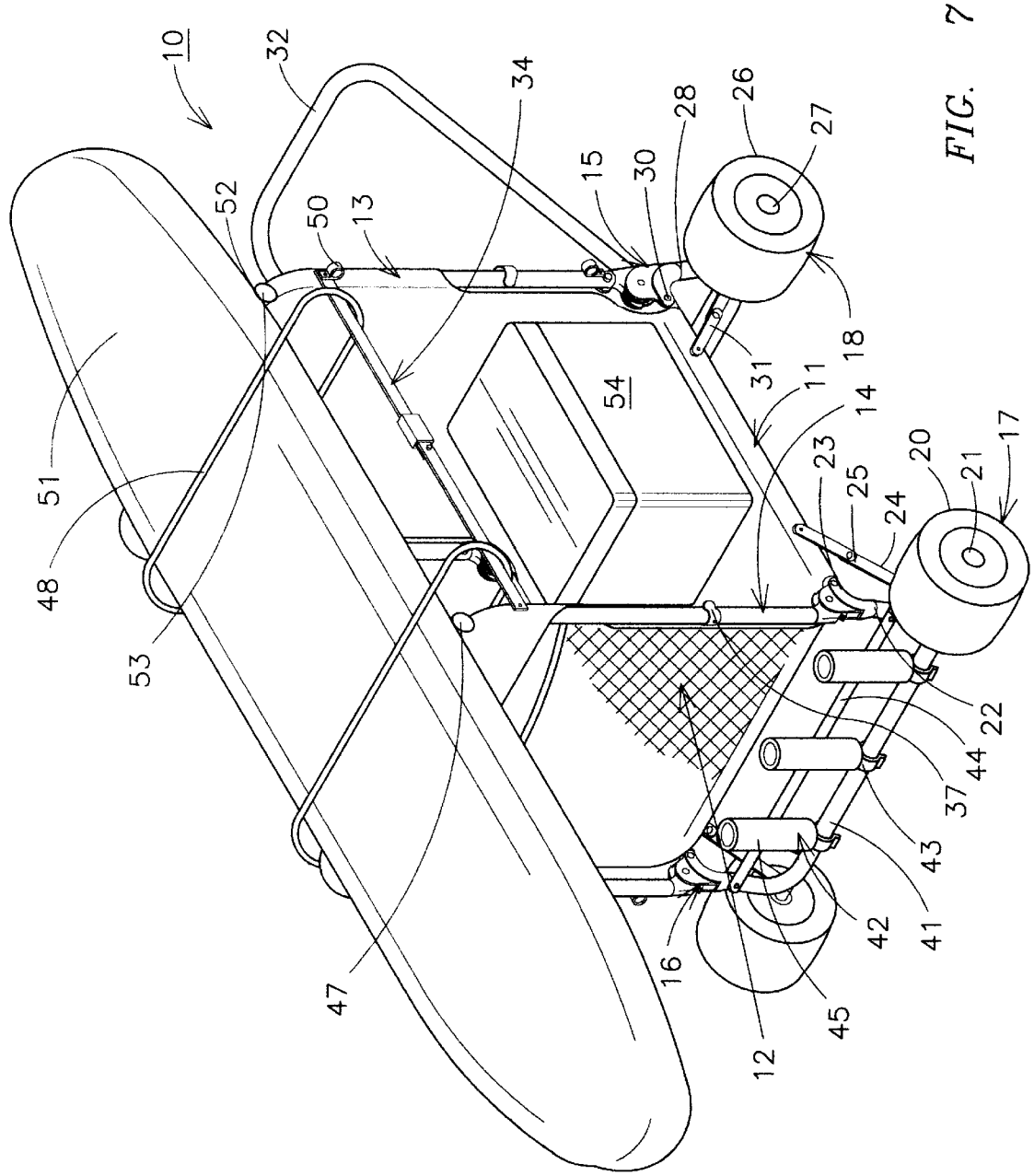
FIG. 7 is a perspective view of FIGS. 1–6 having a surfboard loaded thereon.

Referring to FIGS. 1–7 of the drawings, a combination chaise lounge and tote cart 10 is formed with a base frame 11 having a fabric covering 12 which may be a polymer mesh or straps attached to the frame. An extension frame 13 is also covered with the fabric 12 as is the extension frame 14. The extension frame 13 is hinged with a hinge assembly 15 to the base frame 11 while the extension frame 14 is hinged to the base frame 11 with a pair of hinge assemblies 16. The hinge assemblies 15 and 16 are locking hinges which allow the extensions 13 and 14 to be folded over on the hinges to a restored position, as shown in FIG. 1, or to a cart position, as shown in FIG. 4, or to a chaise lounge position, as shown in FIG. 2. A pair of front wheel assemblies 17 are hinged to the base frame 11 and a pair of rear wheel assemblies 18 are hinged to the rear of the base frame 11 to make the base frame 11 a four wheeled base. The wheel assembly 17 has a wheel 20 rotatably attached to a bearing shaft 21 supported on a wheel strut 22 and hinged on the hinge pin 23. Each wheel assembly 17 has a folding brace 24 which folds on a hinge pin 25 to allow the wheels to fold from the position shown in FIG. 2 to the position shown in FIG. 1 on the hinge 23 and locked in an extended position, as shown in FIG. 2. The rear wheel assembly 18 also has a wheel 26 riding on a shaft 27 and having a wheel strut 28 rotating on a hinge pin 30 and has a folding brace 31. Thus, the wheel assemblies 17 and 18 can be locked in an extended position, as shown in FIG. 2, and then folded into a storage position, as shown in FIG. 1. A cart handle 32 is hinged to the base frame 11 so that when the chaise lounge cart is in a cart position, as shown in FIGS. 4, 6 and 7, a handle can be grasped for pulling the cart.

Each of the hinge assemblies 15 and 16 supporting the extension frames 13 and 14 to the base frame 11 is a locking hinge assembly operating with a hinge having a ratchet and pawl for latching the hinge in any position desired where the pawl falls within the gear teeth of the ratchet. Any kind of hinge assembly desired can be used but one preferred hinge can be see in the Rauschenberger U.S. Pat. No. 4,354,710 for a hinge for a chaise and the like which allows the hinge to be rotated in one direction to any desired position while locking it from movement in the other direction. Thus, the chaise extension frame 13 can be placed in any position desired, as shown in FIG. 2, and will hold its position against a person laying against the extension 13.

The chaise lounge cart is shown in FIG. 1 in its folded storage position and, in FIG. 3, has the wheels opened into an extended position and has the extension frame 13 and 14 rotated on the hinges 15 and 16 on the base 11 to the cart position, as shown in FIG. 4. The hinges 15 and 16 will allow the frames to be held in an upright position in FIG. 4 without falling backwards but will allow the frames to rotate in a forward direction. A pair of locking bars 33 and 34 each have a pair of hinged locking bar arms 35 and 36. The locking bar arm 35 is hinged to the extension frame 13 while the locking bar arm 33 is hinged to the frame portion 14 and the arms are hinged together. The locking arm 33 and 35 can be disconnected from one end and folded for storage where they are held by locking arm clips 37 on the side of the extension frames 13 and 14. When in a cart position, as shown in FIG. 4, the locking arms are connected to extension frames 13 and 14 and are pushed down into an extended position and locked with the clamp 38 which can slide from one locking arm 36 over the end of the locking arm 35 where it holds the arms in a locked extended position.

The extension frame 14 has a storage pocket 40 formed within the covering fabric 12, as seen in FIG. 4. The front wheel assembly 17 axle supporting strut 41, as seen in FIG. 4, has a fishing rod holder 42 attached thereto with the clips 43 and the supporting bar 44 which is attached to the upright strut portions 22 and 28. Fishing pole holding tubes 45 are attached to the strut member 41 and the support bar 44 for holding the handle of fishing rods 46, as seen in FIG. 6. The fishing rods are held by the rod guides 49 on the top frame portion 47 of the extension frame 14 where an elastic cord 48, such as a bungie cord, extends around the fishing poles 46 to hold them to the extension frame 14. The elastic cord attaching members 50 can be seen in FIG. 7 attached to extension frame member. The attached elastic cord 48 can also be used for supporting a surfboard 51 or the like, as seen in FIG. 7, across the top 47 of the extension frame 14 and the top frame member 52 of the extension frame 13. The tops 47 and 50 can have a padded section 53 for supporting and cushioning the surfboard 51. FIG. 7 also illustrates a cooler 54 being carried in the cart and supported on the base frame 42 and fabric covering.

As seen in FIG. 4, a side covering 55 can be attached to the upright extension frames 13 and 14 on either one or both sides to hold items within the chaise lounge cart when in a cart position. This allows items, such as towels and the like, to be thrown within the cart and held without falling out of the cart when pulling the cart to another location or back to the car. Also, as seen in FIG. 4, the elastic cord 48 can be held between cord holders 50 on the side of the extension frames 13 and 14.

In operation, the cart can be folded, as shown in FIG. 1, for storage while at home and for storage in the trunk for taking to the beach or other outing. The cart can then be quickly extended to the position shown in FIG. 4 into a cart and can have a cooler 54 and other beach items loaded thereon including fishing rods 46 or, alternatively, a surfboard 51 which can be held with the bungie cord 48. The handle 32 can then be grasped to pull the cart down to the beach or to a picnic area where it can be unloaded and then the locking arms 33 and 34 disconnected and reclipped to their storage clips 37 on each extension frame 13 and 14 and the bungie cord stored on its storage clips 50 and the chaise lounge extension frames 13 and 14 extended, as shown in FIG. 2, to make for a chaise lounge for suntanning or relaxing on the beach.

It should be clear at this point that a combination chaise lounge and tote cart has been provided which advantageously forms a four wheeled cart with a pull-type handle which can be folded into a compact storage position and then expanded for a cart for hauling water coolers and other beach or picnic items and which can then be unloaded and expanded into a chaise lounge. The four large wheels make for easy movement over sand, soil, and other surfaces and also makes for a firm support for both the chaise lounge and the cart. However, it should also be clear that the present invention is not to be construed to the forms shown which are considered illustrative rather than restrictive.

I claim:

1. A combination chaise lounge and tote cart comprising:
   a fabric covered base frame having a pair of end portions;
   a first fabric covered extension frame having two end portions;

at least one first locking hinge hingedly connecting one end portion of said first extension frame to one end of said base frame;

a second fabric covered extension frame having two end portions;

at least one second locking hinge hingedly connecting one end portion of said second extension frame to one end of said base frame;

a first pair of wheel assemblies attached to one end portion of said base frame;

a second pair of wheel assemblies attached to the other end portion of said base frame;

a locking bar for removable connecting said first and second extension frames together in a predetermined position relative to each other to thereby hold said first and second locking hinges in a locked position relative to said base; whereby said base frame can be supported on said first and second pairs of wheels and said first and second fabric covered extension frames folded on said first and second locking hinges to form an extended chaise lounge position for supporting a person thereon and said first and second extension frames can be rotated to form an upright cart position locked together with said locking bar and first and second locking hinges.

2. A combination chaise lounge and tote cart in accordance with claim 1 including a handle attached to said base frame for pulling said combination chaise lounge and tote cart when locked in a tote cart position.

3. A combination chaise lounge and tote cart in accordance with claim 1 including at least one flexible side wall attachable between said first and second extension frames when said first and second extension frames are in an upright cart position.

4. A combination chaise lounge and tote cart in accordance with claim 3 including two flexible side walls attachable between said first and second extension frames when said first and second extension frames are in an upright cart position.

5. A combination chaise lounge and tote cart in accordance with claim 1 in which said first and second extension frames each fold over on each other and adjacent said base frame for storage and hauling of said chaise lounge cart.

6. A combination chaise lounge and tote cart in accordance with claim 5 in which each of said first and second pair of wheel assemblies includes a hinge connecting each said wheel assembly to said base frame to thereby allow each said first and second wheel assembly to fold on said base frame to thereby form a compact foldable chaise lounge cart.

7. A combination chaise lounge and tote cart in accordance with claim 5 in which each said hinged first and second pair of wheel assemblies includes a locking folding brace connected between each said wheel assembly and said base frame to thereby lock each said wheel assembly in an operative extended position.

8. A combination chaise lounge and tote cart in accordance with claim 1 in which said handle is hinged to said base frame and folds relative thereto.

9. A combination chaise lounge and tote cart in accordance with claim 1 including a rod holder attached to said base frame for holding one end of a plurality of rods therein.

10. A combination chaise lounge and tote cart in accordance with claim 1 in which said first and second extension frames each has a padded frame member positioned for supporting a surface across both said first and second extension frame member when said first and second extension frames are in an upright cart position.

11. A combination chaise lounge and tote cart in accordance with claim 1 in which one said extension frames fabric covering has a pocket formed therein.

12. A combination chaise lounge and tote cart in accordance with claim 1 in which one of said first and second extensions frame's has a cord attaching member attached thereto.

13. A combination chaise lounge and tote cart in accordance with claim 1 in which one of said first and second extension frames has an elastic cord attached thereto.

14. A combination chaise lounge and tote cart in accordance with claim 1 having two locking bars for removably connecting said first and second extension frames together.

15. A combination chaise lounge and tote cart in accordance with claim 1 in which each said locking bar has two members, each member being hinged to one extension frame and said locking bar having connecting means for connecting said two locking bar members together.

* * * * *